(No Model.)  2 Sheets—Sheet 1.
T. H. HARRIS.
STRETCHER FOR PANTALOONS AND OTHER GARMENTS.
No. 286,812. Patented Oct. 16, 1883.
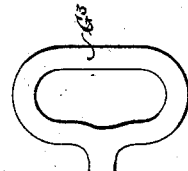
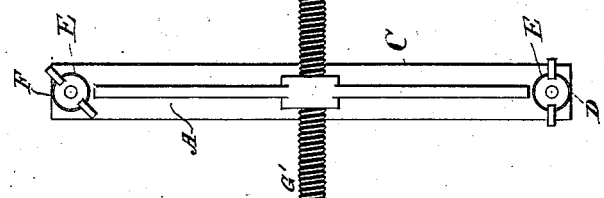
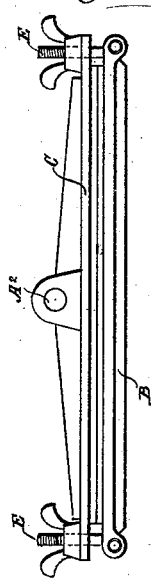
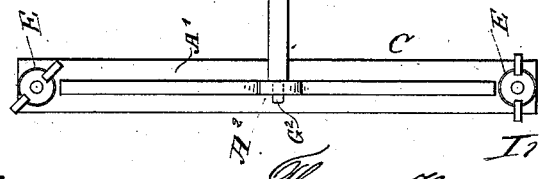
Witnesses
Gilbert B. Towles
William E. Poulter
Inventor
Thomas Henry Harris (No Model.) 2 Sheets—Sheet 2.
T. H. HARRIS.
STRETCHER FOR PANTALOONS AND OTHER GARMENTS.
No. 286,812. Patented Oct. 16, 1883.
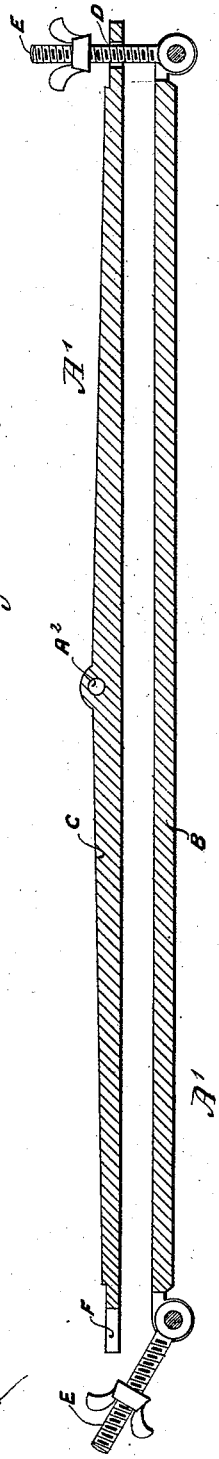

UNITED STATES PATENT OFFICE.

THOMAS HENRY HARRIS, OF LONDON, ENGLAND.

STRETCHER FOR PANTALOONS AND OTHER GARMENTS.

SPECIFICATION forming part of Letters Patent No. 286,812, dated October 16, 1883.

Application filed November 13, 1882. (No model.) Patented in England April 18, 1882, No. 1,841.

*To all whom it may concern:*

Be it known that I, THOMAS HENRY HARRIS, a subject of the Queen of England, residing at London, England, have invented a new and useful Improvement in Stretchers for Trousers and other Articles, (for which I have obtained a patent in Great Britain, dated April 18, 1882, No. 1,841,) of which the following is a specification.

Figure 1 is a plan view, Fig. 2 an end elevation, and Fig. 3 a transverse section through one of the clamps, of my improved trousers-stretcher.

This invention will be best understood by reference to the accompanying drawings.

Two clamps or stretchers, A A', hold each one end of the trouser-legs or other article. These clamps may be of any suitable construction—such, for instance, as the form shown in the drawings. This consists of two bars, B and C, one of which, B, carries a jointed and threaded pin, E, at each end, upon which works a thumb-nut. The other bar, C, has a hole, D, at one end, which slips over one of the screwed pins, which thus acts as a hinge, but allows the distance between the two bars to be adjusted. The other end of the second bar is formed into a jaw, F, into which the screwed pin is placed, and the nut being screwed down, it causes the bars to firmly grip the trousers placed therein. The rod G, screwed as at G', screws into the clamp A', while its end $G^2$ is reduced, so as to leave a collar, and fits into the central hole, $A^2$, of the clamp A'. It will be readily understood that by turning the rod G and screwing it through clamp A' its other end will force clamp A away from clamp A', and thus stretch the trousers to any required degree. The end $G^3$ is by preference formed into a loop, which serves as a handle to turn the rod by and hang the stretcher up.

It is sometimes desirable to divide the rod G into two parts, as at $G^4$, so that it can be taken apart and the whole packed in a small compass, and for the same purpose the clamps are by preference not fastened upon the rod G, but can be removed at pleasure.

What I claim is—

1. The combination, with the screw-rod G, of the clamps A A', consisting of clamping-bars B C, the screw-pins E, hinged to the opposite ends of bars B, one of said pins passing through a perforation in bar C at one end and through a slot at the opposite end, and carrying thumb-nuts, substantially as described, for the purpose set forth.

2. The combination, with the sectional screw-rod G, jointed as at $G^4$, and looped at its outer end, of the removable clamps A A', composed of clamping-bars C, having perforations D at one end and jaws F at the other, and clamping-bars B, and screw-pins E, hinged to the opposite ends of said bars and carrying thumb-nuts, all constructed and arranged for operation substantially as described, for the purposes specified.

THOMAS HENRY HARRIS.

Witnesses:
ALFRED J. BOULT,
BERNHARD DUKES.